(12) United States Patent
Windeler

(10) Patent No.: US 9,834,140 B2
(45) Date of Patent: Dec. 5, 2017

(54) TRAILER HITCH GUIDANCE METHOD

(71) Applicant: Joshua G Windeler, Grand Blanc, MI (US)

(72) Inventor: Joshua G Windeler, Grand Blanc, MI (US)

(73) Assignee: FCA US LLC, Auburn Hills, MI (US)

( * ) Notice: Subject to any disclaimer, the term of this patent is extended or adjusted under 35 U.S.C. 154(b) by 745 days.

(21) Appl. No.: 14/337,619

(22) Filed: Jul. 22, 2014

(65) Prior Publication Data
US 2016/0023601 A1   Jan. 28, 2016

(51) Int. Cl.
B60R 1/00 (2006.01)
H04N 7/18 (2006.01)
B60D 1/36 (2006.01)
B62D 15/02 (2006.01)
B60D 1/06 (2006.01)
B60D 1/62 (2006.01)

(52) U.S. Cl.
CPC .................. B60R 1/00 (2013.01); B60D 1/06 (2013.01); B60D 1/36 (2013.01); B60D 1/62 (2013.01); B62D 15/0275 (2013.01); H04N 7/183 (2013.01); B60R 2300/808 (2013.01); B60R 2300/8086 (2013.01)

(58) Field of Classification Search
CPC ....................................................... B60R 1/00
See application file for complete search history.

(56) References Cited

U.S. PATENT DOCUMENTS

| | | | |
|---|---|---|---|
| 7,777,615 B2 | 8/2010 | Okuda et al. | |
| 2009/0040300 A1 | 2/2009 | Scribner | |
| 2010/0070139 A1* | 3/2010 | Ohshima | B60R 1/00 701/42 |
| 2010/0235053 A1* | 9/2010 | Iwakiri | B62D 15/027 701/42 |
| 2010/0324770 A1 | 12/2010 | Ramsey et al. | |
| 2013/0046441 A1* | 2/2013 | Marczok | B60Q 9/005 701/41 |
| 2013/0226390 A1 | 8/2013 | Luo et al. | |
| 2015/0115571 A1* | 4/2015 | Zhang | B60D 1/06 280/477 |
| 2015/0179075 A1* | 6/2015 | Lee | G08G 1/165 340/932.2 |

* cited by examiner

Primary Examiner — James Pontius
(74) Attorney, Agent, or Firm — Ralph E. Smith

(57) ABSTRACT

A method of providing visual reverse steering guidance indicators on a display in a vehicle includes having an electronic control unit display on a display in the vehicle an image of an area behind the vehicle that includes a target, display a projected path track of a projected path that the vehicle will travel based on a current alignment of a steering system of the vehicle, display a visual indicator of whether the projected path matches a target path that the vehicle must travel in reverse to align the vehicle with the target, when the projected path does not match the target path, displaying a visual indicator of a direction that a steering wheel of the vehicle must be turned to align the projected path with the target path, and updating the visual guidance indicators in real time as the vehicle is driven in reverse toward the target.

8 Claims, 5 Drawing Sheets

TRAILER HITCH GUIDANCE METHOD

FIELD

The present invention relates to a method of providing guidance to vehicle drivers when hitching a trailer.

BACKGROUND

Trailers are typically hitched to vehicles using, in the case of passenger vehicles, a trailer hitch that is mounted at the lower rear of the vehicle. The trailer coupling is at a similar height. The vehicle driver must then manipulate the vehicle to align the trailer hitch with the trailer coupling, which is typically disposed at a front of the trailer. When the rear of the vehicle gets close to the front of the trailer, the driver of the vehicle typically cannot see either the trailer hitch or the trailer coupling. Further, when manipulating the vehicle to align the trailer hitch to the trailer coupling, the driver is typically operating the vehicle in reverse.

There are systems that provide guidance to the driver to aid the driver in aligning the trailer hitch with the trailer coupling. There are for example the systems disclosed in US 2013/0226390 for "Hitch Alignment Assistance," US 2010/0324770 for "Trailer Hitch Alignment Device and Method," US 2009/0040300 for "Removably Mountable, Portable Vision System," and U.S. Pat. No. 7,777,615 for "System for Assisting the Attachment of a Trailer to a Vehicle." Some of those systems have provided visual indicators such as on a vehicle's radio head or navigation system screen to guide the driver in steering the vehicle as the driver manipulates the vehicle to align the trailer hitch to the trailer coupling. In these systems, the driver will be looking forward at the display and it is typically more difficult for a driver to steer a vehicle moving in reverse when the driver is looking forward. As such, it is desirable to have a system that provides visual indicators on a display to a driver looking forward at the display that provide guidance to the driver as to the appropriate direction to turn a steering wheel of the vehicle to steer it along a target path to align a trailer hitch with a trailer coupling.

SUMMARY

In accordance with an aspect of the present disclosure, a method of providing visual reverse steering guidance indicators on a display in a vehicle having an electronic control unit coupled to the display includes having the electronic control unit display on the display an image of an area behind the vehicle that includes a target, having the electronic control module display on the display a projected path track of a projected path that the vehicle will travel based on a current alignment of a steering system of the vehicle, having the electronic control unit display on the display a visual indicator of whether the projected path matches a target path that the vehicle must travel in reverse to align the vehicle with the target, when the projected path does not match the target path, having the electronic control unit display on the display a visual indicator of a direction that a steering wheel of the vehicle must be turned to align the projected path with the target path, and having the electronic control unit update the visual guidance indicators being displayed on the display in real time as the vehicle is driven in reverse toward the target.

In an aspect having the electronic control unit display the visual indicator on the display of the direction that the steering wheel must be turned to align the projected path with the target path includes having the electronic control unit display on the display an icon of a steering wheel and a direction arrow in proximity to the steering wheel icon pointing in the direction that the steering wheel must be turned. In an aspect, when the projected path does not match the target path, having the electronic control unit display on the display the target path. In an aspect, having the electronic control unit display the projected path and the target path includes having the electronic control unit display the projected path and the target path in different colors.

In an aspect, having the electronic control unit display on the display the visual indicator of whether the projected path matches the target path includes having the electronic control unit display on the display the projected path in a first color when the projected path matches the target path and in a second color that is different than the first color when the projected path does not match the target path.

In an aspect, the method includes having the electronic control unit display a steering wheel icon on the display in the first color when the projected path matches the target path and in the second color when the projected path does not match the target path and wherein having the electronic control unit display the visual indicator on the display of the direction that the steering wheel must be turned to align the projected path with the target path includes having the electronic control unit display on the display a direction arrow in the second different color in proximity to the steering wheel icon pointing in the direction that the steering wheel must be turned.

In an aspect, the method includes having the electronic control unit accept an input from a user selecting the target.

In an aspect, the target is a trailer coupling of a trailer and having the electronic control unit display on the display the visual indicator of whether the projected path matches the target path includes having the electronic unit display on the display the visual indicator of whether the projected path matches the target path to align a trailer hitch of the vehicle to the trailer coupling.

BRIEF DESCRIPTION OF THE DRAWINGS

The present invention will become more fully understood from the detailed description and the accompanying drawings, wherein.

DETAILED DESCRIPTION

The following description of the preferred embodiment(s) is merely exemplary in nature and is in no way intended to limit the invention, its application, or uses.

Figure 1:
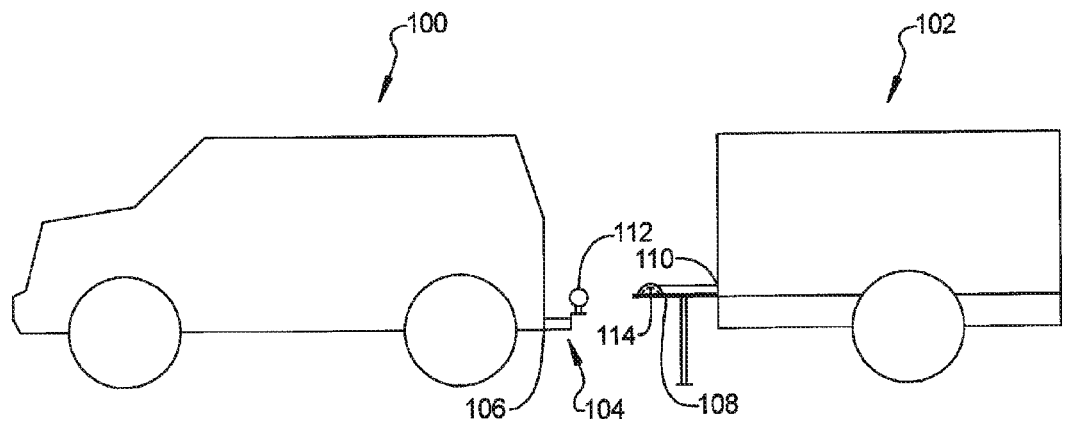
FIG. 1 is a simplified diagrammatic view of a vehicle and a trailer.

FIG. 1 is a simplified diagrammatic view of a vehicle 100 and trailer 102. Vehicle 100 has a trailer hitch 104 mounted at a lower rear 106 of vehicle 100 that projects backwardly from the lower rear 106 of vehicle 100. Trailer 102 has a trailer coupling 108 at a lower front 110 of trailer 102. Trailer coupling 108 projects forwardly from lower front 110 of trailer 102. Trailer hitch 104 is shown as a typical ball type trailer hitch having a ball 112 over which a recess 114 of trailer coupling 108 is received.

Figure 2:
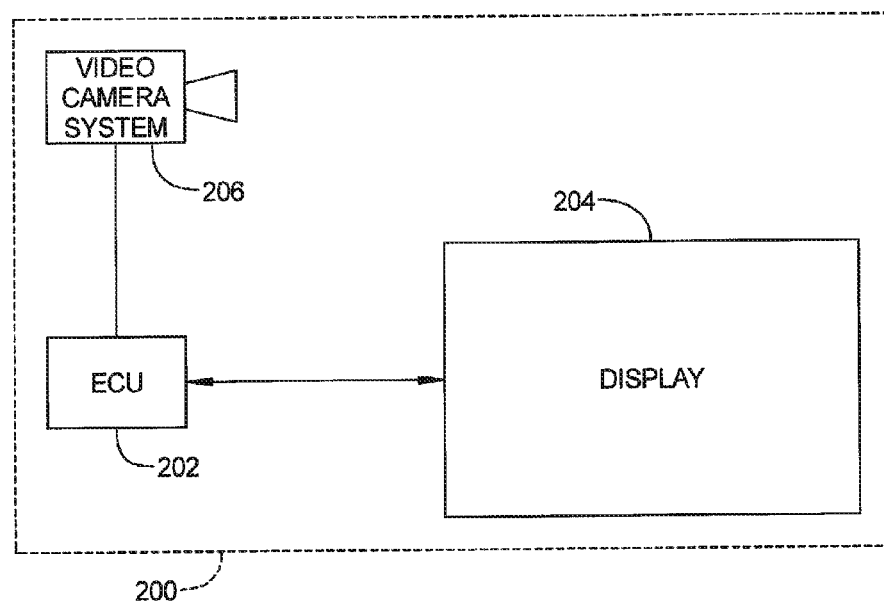
FIG. 2 is a basic block diagram of a system in accordance with an aspect of the present disclosure that provide a guidance method in accordance with an aspect of the present disclosure.

To hitch trailer 102 to vehicle 100, a driver of the vehicle must back vehicle 100 (drive vehicle 100 in reverse) so that trailer hitch 104 aligns with trailer coupling 108. A guidance method in accordance with an aspect of the present disclosure described in more detail below provides visual guidance on a display to the driver for maneuvering the vehicle while driving it in reverse to align the trailer hitch 104 with trailer coupling 108. FIG. 2 is a basic block diagram of a system 200 in accordance with an aspect of the present disclosure for that provides the above discussed guidance method. System 200 includes an electronic control unit ("ECU") 202, a display 204, and a rear facing video camera system 206 that "sees" an area behind a rear of vehicle 100. System 200 is installed in a vehicle, for example, vehicle 100. In an aspect, ECU is an ECU of vehicle 100, such as a body controller. In an aspect, ECU is a separate ECU. The display 204 for example is a known type display of a radio head unit mounted for example in a center of the instrument panel of the vehicle. Display 204 is also a known type of touch screen display such as those currently used for displays of certain radio head units. Video camera system 206 is a known type of camera system, such a back-up video camera system currently used in a number of different vehicles.

Figure 3:
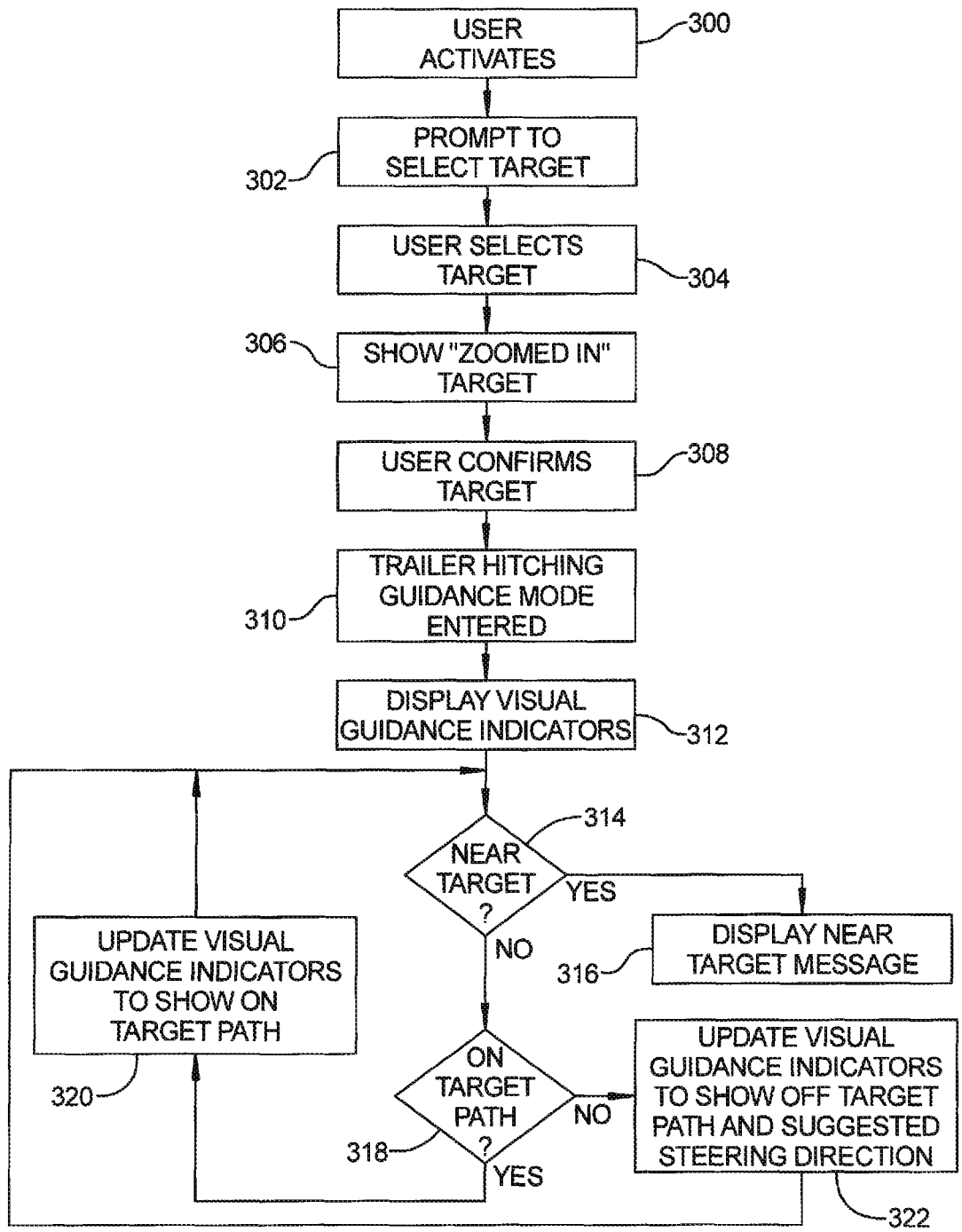
FIG. 3 is a flow chart of a guidance method in accordance with an aspect of the present disclosure.
Figure 4:
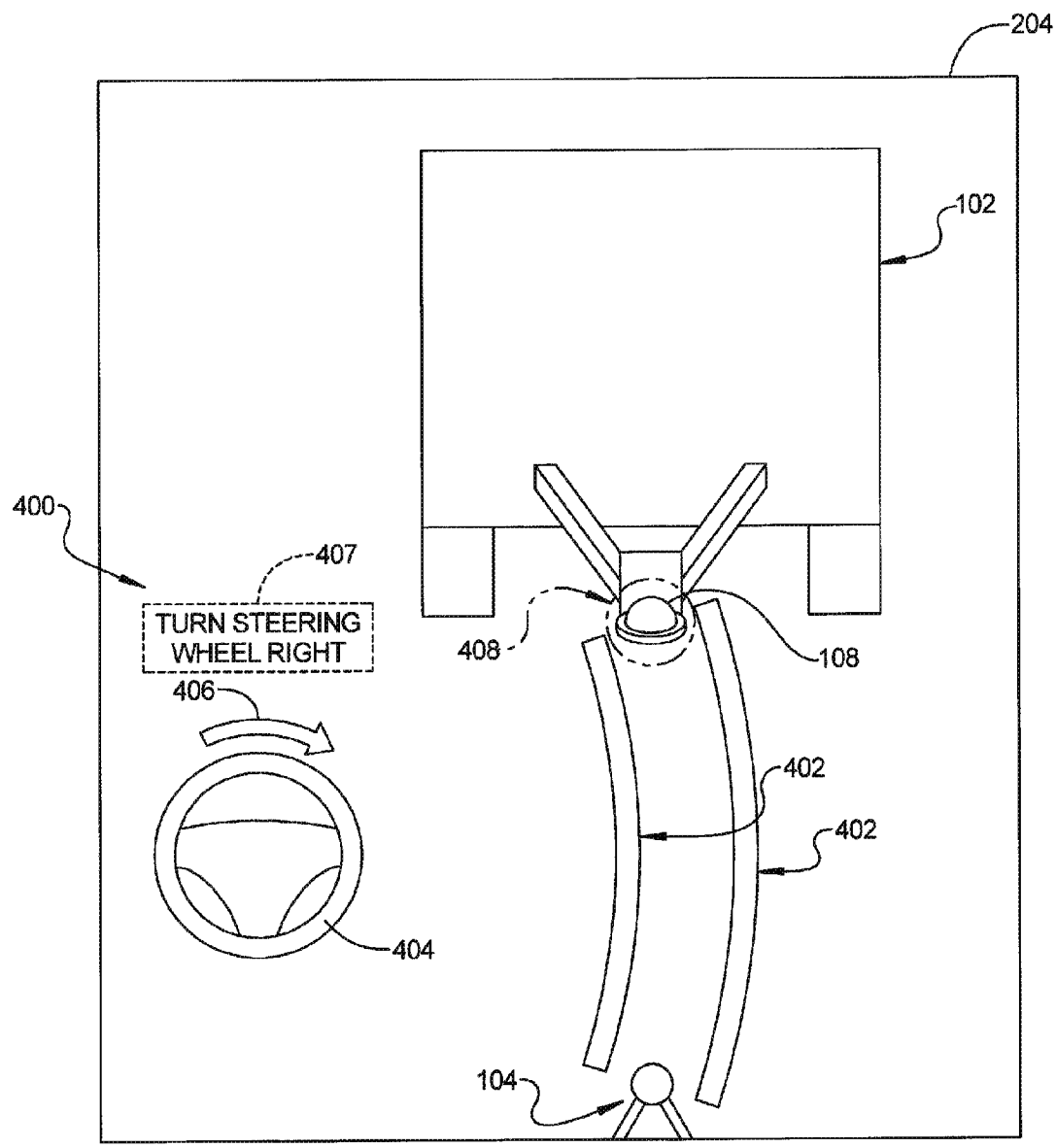
FIG. 4 is a perspective view of the display of FIG. 2 with an image thereon illustrating an aspect of the guidance method of FIG. 3.

FIG. 3 is a flow chart of a guidance method in accordance with an aspect of the present disclosure and FIG. 4 shows an image on display 204. With reference to FIG. 3, at 300 a user (such as a driver of a vehicle) activates the guidance feature. At 302, system 200 displays the video from camera system 206 of the area behind vehicle 100 and prompts on display 204 for the user to select a target. The target is the trailer coupling of the trailer to be hitched to trailer hitch 104, such as trailer coupling 108 of trailer 102. At 304, the user selects the target such as by highlighting it on display 204. In this regard, when display 204 is a touch screen display, the user illustratively touches the target shown on display 204 to highlight the target. At 306, system 200 displays a zoomed in image of the selected target. In an aspect, the zoomed in image is a "picture-in-picture" displayed on display 204. At 308, the user confirms the selected target, such as by touching it on display 204. At 310, system 200 enters the trailer hitching guidance mode.

At 312, system 200 displays visual guidance indicators 400 to guide the driver in maneuvering the vehicle in reverse to align trailer hitch 104 with trailer coupling 108. System 200 also determines a target path that that vehicle 100 should take to align trailer hitch 104 to trailer coupling 108. One example is the dynamic vehicle path modeling known as the two degree of freedom vehicle dynamics model, sometimes known as the "bicycle model," as described in "Race Car Vehicle Dynamics" by William F. Milliken and Douglas R. Milliken (1994) available from SAE International. It should be understood that other types of dynamic vehicle path modeling are useable and the dynamic vehicle path modeling used is not limited to the bicycle model.

At 314, system 200 determines whether vehicle 100 is near the target, that is, near trailer 102. If so, at 316 system 200 displays a message on display 204 that vehicle 100 is near trailer 102, meaning that vehicle 100 has reached the target (trailer 102). If not, at 318 system 200 checks whether vehicle 100 is aligned so that its projected path matches the target path. If so, at 320 system 200 updates visual guidance indicators 400 to indicate that the projected vehicle path matches the target path, as discussed below, and branches back to 314. If not, at 322, system 200 updates visual guidance indicators 400 to indicate that the projected vehicle path does not match the target path, as discussed below, and branches back to 314. It should be understood visual guidance indicators 400 on a real time basis as vehicle 100 is driven in reverse toward the target. By real time, it is meant that the updates occur sufficiently frequently, such as every few milliseconds, so that the updates of the visual guidance indicators displayed on display 204 are available on display 204 virtually immediately as feedback to the driver.

Figure 5:
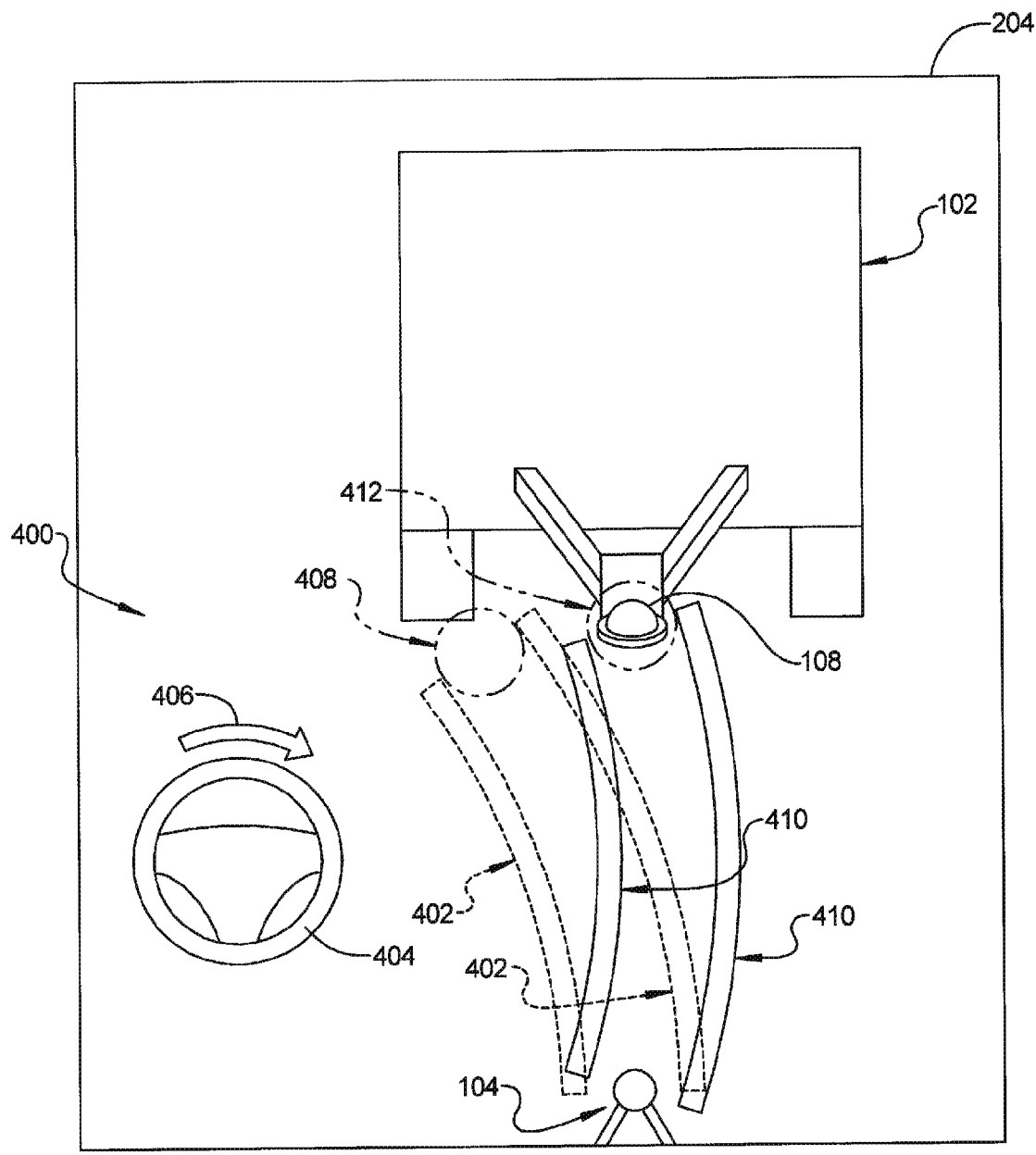
FIG. 5 is a perspective view of the display of FIG. 2 with an image thereon illustrating an aspect of the guidance method of FIG. 3.

In the example shown in FIGS. 4 and 5, the visual guidance indicators 400 include projected path tracks 402, steering wheel icon 404, directional arrow 406 and end reticule 408. In an aspect, the visual guidance indicators 400 also include text stating a direction to turn the steering wheel shown in phantom text box 407 in FIG. 4. Projected path tracks 402 represent the projected path that the vehicle will follow as vehicle 100 is presently aligned as vehicle 100 is driven in reverse to align trailer hitch 104 to trailer coupling 108. System 200 determines the projected path tracks 402 such as based on a steering angle of vehicle 100, such as an angle at which a steering wheel of vehicle 100 is positioned, an angle at which front wheels of vehicle 100 are positioned, or the like. In the example shown in FIG. 4, there are two projected path tracks 402 and a projected path end reticule 408 is suspended between the two projected path tracks 402. In FIG. 4, the projected vehicle path and target path match, so the end reticule 408 is positioned over trailer coupling 108.

In an illustrative example, when the projected vehicle path matches the target path, such as shown in FIG. 4, system 200 will display projected path tracks 402 in a color, such as green, and end reticule 408 will be positioned over trailer coupling 108, the end target. When the projected vehicle path does not match the target path, system 200 will as shown in FIG. 5 display projected path tracks 402 in another color, such as red, and end reticule 408 will be positioned to one side of trailer coupling 108 as the ends of projected path tracks 402 will then have moved laterally with respect to trailer coupling 108. In an aspect, system 200 will also display target path tracks 410 for the target path, also included in visual guidance indicators 400 in this example, but in a different color than projected path tracks 402, such as in yellow, and also display a target reticule 412 positioned over trailer coupling 108. By displaying projected path tracks for both the projected vehicle path and target path, a vehicle driver is provided a reference to see how far off the projected vehicle path is from the target path. Also, as the driver turns the steering wheel of vehicle 100, the driver will see the projected path tracks 402 move with respect to target path tracks 410 and thus see when the steering wheel of vehicle 100 is properly positioned so that vehicle 100 will travel along the target path. As discussed above, this occurs when the projected path tracks 402 turn green when they match the target path tracks 410.

In a variation, different line types are used to display projected path tracks 402 when the projected vehicle path matches the target path and when it does not. For example, solid lines are used for projected path tracks 402 when the projected vehicle path matches the target path and dashed lines are used for projected path tracks 402 when the projected vehicle path does not match the target path. In another variation, both different colors and different line types are used.

In an aspect, system 200 also displays steering wheel icon in different colors depending on whether the projected vehicle path matches the target path and when it does not. For example, system 200 displays steering wheel icon in green when the projected vehicle path matches the target path and in red when it does not. In an aspect, when the projected vehicle path does not match the target path, system 200 also displays steering directional arrow 406 pointing in the direction that the driver should turn the steering wheel of vehicle 100 to align vehicle 100 so that the projected vehicle path will match the target path.

Figure 6:
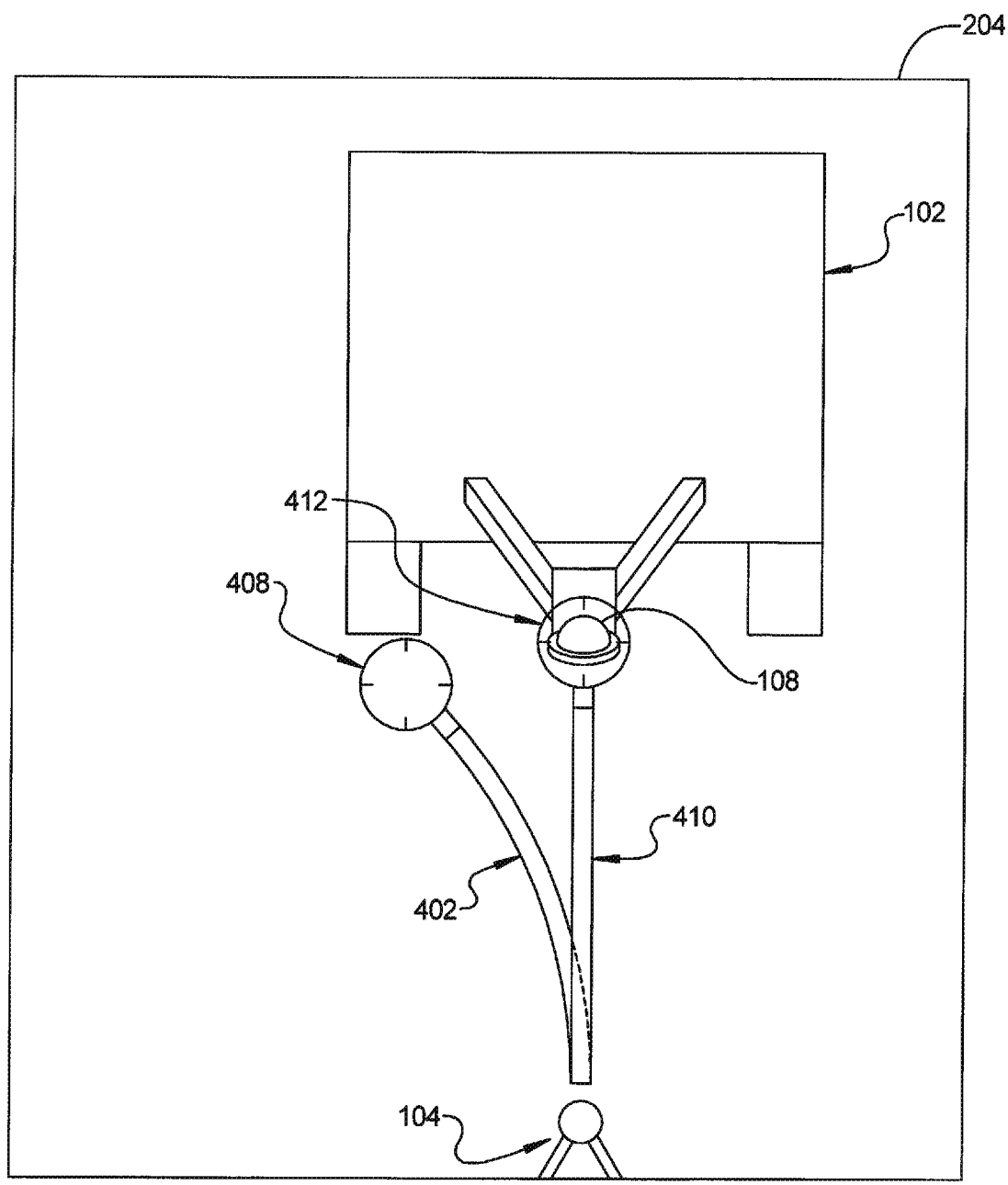
FIG. 6 is a perspective view of the display of FIG. 2 with an image thereon illustrating a variation of the images shown in FIGS. 4 and 5.

In the examples of FIGS. 4 and 5, there were two projected path tracks 402 and two target path tracks 410. In another example shown in FIG. 6, there is a single projected path track 402 and a single target path track 410.

Electronic control unit 202 in which the above described methods are implemented is or includes any of a digital processor (DSP), microprocessor, microcontroller, or other programmable device which are programmed with software implementing the above described methods. It should be understood that it is or includes other logic devices, such as a Field Programmable Gate Array (FPGA), a complex programmable logic device (CPLD), or application specific integrated circuit (ASIC). When it is stated that system 200 a function or is configured to perform a function, it should be understood that electronic control unit 202 is configured to do so with appropriate logic (software, hardware, or a combination of both), such as by appropriate software, electronic circuit(s) including discrete and integrated logic, or combination thereof.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of providing visual reverse steering guidance indicators on a display in a vehicle having an electronic control unit coupled to the display, comprising:

having the electronic control unit display on the display an image of an area behind the vehicle that includes a target;

having the electronic control unit display on the display a projected path track of a projected path that the vehicle will travel based on a current alignment of a steering system of the vehicle;

having the electronic control unit display on the display a visual indicator of whether the projected path matches a target path that the vehicle must travel in reverse to align the vehicle with the target by displaying on the display the projected path in a first color when the projected path matches the target path and in a second color that is different than the first color when the projected path does not match the target path;

when the projected path does not match the target path, having the electronic control unit display on the display a visual indicator of a direction that a steering wheel of the vehicle must be turned to align the projected path with the target path; and having the electronic control unit update the visual guidance indicators being displayed on the display in real time as the vehicle is driven in reverse toward the target.

2. The method of claim 1 wherein having the electronic control unit display the visual indicator on the display of the direction that the steering wheel must be turned to align the projected path with the target path includes having the electronic control unit display on the display a steering wheel icon and a direction arrow in proximity to the steering wheel icon pointing in the direction that the steering wheel must be turned.

3. The method of claim 1 wherein having the electronic control unit display the visual indicator on the display of the direction that the steering wheel must be turned to align the projected path with the target path includes having the electronic control unit display on the display text of the direction that the steering wheel must be turned.

4. The method of claim 1 wherein when the projected path does not match the target path, having the electronic control unit display on the display the target path.

5. The method of claim 4 wherein having the electronic control unit display on the display the projected path and the target path includes having the electronic control unit display the projected path and target path in different colors.

6. The method of claim 1 including having the electronic control unit display a steering wheel icon on the display in the first color when the projected path matches the target path and in the second color when the projected path does not match the target path and wherein having the electronic control unit display the visual indicator on the display of the direction that the steering wheel must be turned to align the projected path with the target path includes having the electronic control unit display on the display a direction arrow in the second different color in proximity to the steering wheel icon pointing in the direction that the steering wheel must be turned.

7. The method of claim 1 including having the electronic control unit accept an input from a user selecting the target.

8. The method of claim 1 wherein the target is a trailer coupling of a trailer and having the electronic control unit display on the display the visual indicator of whether the projected path matches the target path includes having the electronic unit display on the display the visual indicator of whether the projected path matches the target path to align a trailer hitch of the vehicle to the trailer coupling.

* * * * *